US010760975B2

(12) United States Patent
Kuppusamy

(10) Patent No.: US 10,760,975 B2
(45) Date of Patent: Sep. 1, 2020

(54) RAIL-MOUNTED FIRE DETECTION SYSTEM

(71) Applicant: Kidde Technologies, Inc., Wilson, NC (US)

(72) Inventor: Balasundar Kuppusamy, Karnataka (IN)

(73) Assignee: KIDDIE TECHNOLOGIES, INC., Wilson, NC (US)

( * ) Notice: Subject to any disclaimer, the term of this patent is extended or adjusted under 35 U.S.C. 154(b) by 199 days.

(21) Appl. No.: 15/845,587

(22) Filed: Dec. 18, 2017

(65) Prior Publication Data

US 2019/0113391 A1 Apr. 18, 2019

(30) Foreign Application Priority Data

Oct. 18, 2017 (IN) .............................. 201711036996

(51) Int. Cl.
*G01M 15/14* (2006.01)
*G01K 1/14* (2006.01)
(Continued)

(52) U.S. Cl.
CPC .................. *G01K 1/14* (2013.01); *F02C 7/25* (2013.01); *G01D 11/10* (2013.01); *G01K 13/02* (2013.01);
(Continued)

(58) Field of Classification Search
CPC ..................................................... G01M 15/14
(Continued)

(56) References Cited

U.S. PATENT DOCUMENTS

| 2,982,950 A | 5/1961 | Boyle |
| 4,127,080 A | 11/1978 | Lakiza et al. |

(Continued)

FOREIGN PATENT DOCUMENTS

| CN | 02616108 B | 4/2014 |
| JP | 05231575 A | 9/1993 |

(Continued)

OTHER PUBLICATIONS

Anonymous: "Chapter 17: Fire Protection Systems", Aviation Maintenance Handbook, Aug. 28, 2016 (Aug. 28, 2016), XP002791327, Retrieved from the Internet: URL: http://www.sweethaven02.com/Aviation/MaintHandbookiama_Ch17.pdf [retrieved on May 15, 2019] *pp. 17-4, right-hand column, paragraph Kidde System; figure 17.4 ** overview of chapters under: http://www.sweethaven02.com/Aviation/MaintHandbook/*.

(Continued)

*Primary Examiner* — Eric S. McCall
(74) *Attorney, Agent, or Firm* — Cantor Colburn LLP

(57) ABSTRACT

A rail-mounted fire and overheat detection system includes a rail and a plurality of sensor elements positioned along the rail. A plate is located at a first end of the rail, and secured thereto at a plate opening. One or more damper elements extend about a perimeter of the rail to dampen vibrational forces acting on the rail. A method of assembling a rail-mounted fire and overheat detection system includes installing a first rail end of a rail into a plate opening of a plate, installing one or more damper elements about a perimeter of the rail at the plate opening, and installing a face plate to axially retain the one or more damper elements.

16 Claims, 4 Drawing Sheets

(51) Int. Cl.
  *G01D 11/10* (2006.01)
  *G01K 13/02* (2006.01)
  *F02C 7/25* (2006.01)

(52) U.S. Cl.
  CPC ......... *G01M 15/14* (2013.01); *F05D 2260/96* (2013.01); *G01K 2013/024* (2013.01)

(58) Field of Classification Search
  USPC ...................................................... 73/112.01
  See application file for complete search history.

(56) References Cited

U.S. PATENT DOCUMENTS

| | | | |
|---|---|---|---|
| 4,928,998 A | 5/1990 | Brandener | |
| 5,382,045 A * | 1/1995 | Takeda | B60G 17/0152 |
| | | | 280/5.515 |
| 5,511,828 A | 4/1996 | Kurek et al. | |
| 5,559,701 A * | 9/1996 | Shimizu | B60G 17/018 |
| | | | 701/36 |
| 5,828,797 A * | 10/1998 | Minott | F01D 17/02 |
| | | | 385/12 |
| 6,068,555 A | 5/2000 | Andra et al. | |
| 6,120,012 A * | 9/2000 | Shibata | F16F 13/26 |
| | | | 267/140.14 |
| 6,390,203 B1 * | 5/2002 | Borisov | A62C 3/07 |
| | | | 169/60 |
| 8,096,885 B2 | 1/2012 | MacDonald et al. | |
| 2006/0273223 A1 * | 12/2006 | Haaland | A62C 3/06 |
| | | | 244/129.2 |
| 2007/0119603 A1 * | 5/2007 | Haaland | A62C 3/06 |
| | | | 169/54 |
| 2013/0160291 A1 * | 6/2013 | Broughton | F02C 7/32 |
| | | | 29/888.021 |
| 2013/0294900 A1 | 11/2013 | Graily et al. | |
| 2014/0266746 A1 * | 9/2014 | Rennie | G08B 17/04 |
| | | | 340/626 |
| 2015/0121894 A1 * | 5/2015 | Nilsson | F02C 7/25 |
| | | | 60/779 |
| 2018/0112598 A1 * | 4/2018 | Ricci | F02C 7/25 |
| 2018/0207461 A1 * | 7/2018 | Lucas | A62C 35/68 |
| 2018/0355762 A1 * | 12/2018 | Tripodina | F01D 25/28 |

FOREIGN PATENT DOCUMENTS

| | | |
|---|---|---|
| JP | 0722019 U | 4/1995 |
| JP | 07111131 B2 | 11/1995 |
| JP | 3371440 B2 | 1/2003 |

OTHER PUBLICATIONS

European Search Report Issued in EP Application No. 18201169.2, dated Jun. 5, 2019, 32 Pages.

* cited by examiner

RAIL-MOUNTED FIRE DETECTION SYSTEM

FOREIGN PRIORITY

This application claims priority to India Patent Application No. 201711036996, filed Oct. 18, 2017, and all the benefits accruing therefrom under 35 U.S.C. § 119, the contents of which in its entirety are herein incorporated by reference.

BACKGROUND

Exemplary embodiments pertain to the art of fire detection systems, and more particularly to rail-mounted fire detection systems for, for example, a gas turbine engine.

Many structures and apparatus, such as gas turbine engines, utilize fire and over heat detection systems to monitor locations within the apparatus for fire and/or over heat conditions. Many such systems include a rail on which one or more sensors are located, a so-called rail-mounted fire detection system. The rail is typically secured to a plate at one end of the rail, on which sensor tubes are mounted to connect the sensors to a controller, such as an engine control system. The rail is connected to the plate, typically via a welded connection. During operation of the fire detection system, especially when utilized in a high-vibration environment such as a gas turbine engine, the fire detection system is subjected to high levels of vibration. The welded joint between the plate and the rail may be weakened or may even fail as a result of the vibration.

BRIEF DESCRIPTION

In one embodiment, a rail-mounted fire and overheat detection system includes a rail and a plurality of sensor elements positioned along the rail. A plate is located at a first end of the rail, and secured thereto at a plate opening. One or more damper elements extend about a perimeter of the rail to dampen vibrational forces acting on the rail.

Additionally or alternatively, in this or other embodiments two or more damper elements extend about the perimeter of the rail and a cage is installed to maintain separation between adjacent damper elements of the two or more damper elements.

Additionally or alternatively, in this or other embodiments the cage includes a cage rim and a cage web extending from the cage rim to define two or more damper cavities wherein the two or more damper elements are located.

Additionally or alternatively, in this or other embodiments the one or more damper elements are located at a plate opening between the plate and the rail.

Additionally or alternatively, in this or other embodiments a face plate is secured to the plate to axially retain the one or more damper elements.

Additionally or alternatively, in this or other embodiments the one or more damper elements are one or more garter springs.

Additionally or alternatively, in this or other embodiments wherein the rail includes a rail flange positioned in the plate opening.

Additionally or alternatively, in this or other embodiments the rail flange is secured to the plate at the plate opening via one or more butt welds.

In another embodiment, a rail and plate assembly for a rail-mounted fire and overheat detection system includes a rail, a plate located at a first end of the rail, and secured thereto at a plate opening, and one or more damper elements extending about a perimeter of the rail to dampen vibrational forces acting on the rail.

Additionally or alternatively, in this or other embodiments two or more damper elements extend about the perimeter of the rail, and a cage is installed to maintain separation between adjacent damper elements of the two or more damper elements.

Additionally or alternatively, in this or other embodiments the cage includes a cage rim and a cage web extending from the cage rim to define two or more damper cavities wherein the two or more damper elements are located.

Additionally or alternatively, in this or other embodiments the one or more damper elements are located at a plate opening between the plate and the rail.

Additionally or alternatively, in this or other embodiments a face plate is secured to the plate to axially retain the one or more damper elements.

Additionally or alternatively, in this or other embodiments the one or more damper elements are one or more garter springs.

Additionally or alternatively, in this or other embodiments the rail includes a rail flange positioned in the plate opening.

Additionally or alternatively, in this or other embodiments the rail flange is secured to the plate at the plate opening via one or more butt welds.

In yet another embodiment, a method of assembling a rail-mounted fire and overheat detection system includes installing a first rail end of a rail into a plate opening of a plate, installing one or more damper elements about a perimeter of the rail at the plate opening, and installing a face plate to axially retain the one or more damper elements.

Additionally or alternatively, in this or other embodiments installing one or more damper elements includes installing a first damper element about the perimeter of the rail, installing a cage to axially retain the first damper element, and installing a second damper element.

Additionally or alternatively, in this or other embodiments the first rail end is butt welded to the plate at the plate opening.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
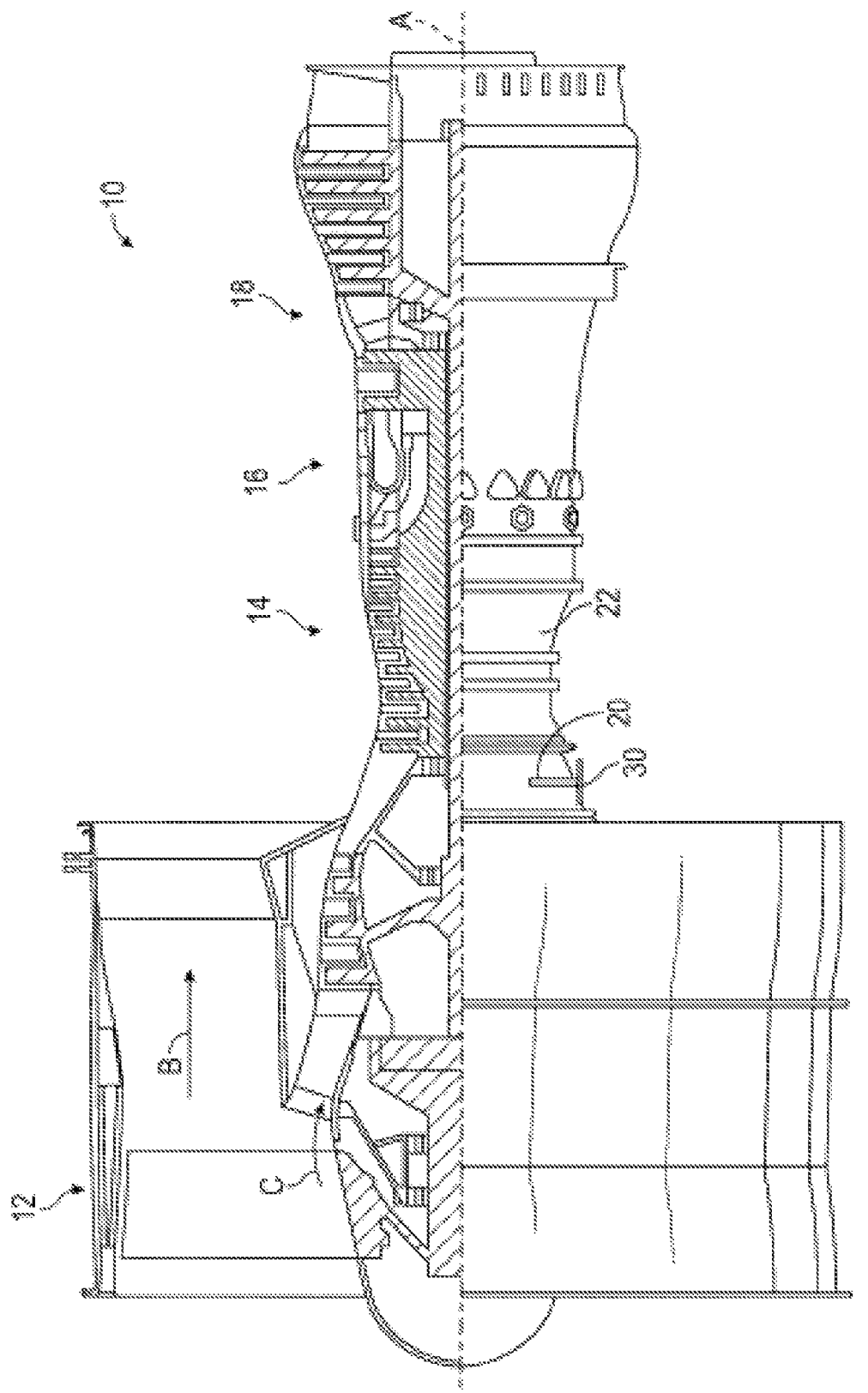
FIG. 1 is a schematic view of an embodiment of a gas turbine engine including a rail-mounted fire and overheat detection system.

Shown in FIG. 1 is an embodiment of a gas turbine engine 10. The gas turbine engine 10 is disclosed herein as a two-spool turbofan that generally incorporates a fan section 12, a compressor section 14, a combustor section 16 and a turbine section 18. Alternative engines might include an augmentor section (not shown) among other systems or features. The fan section 12 drives air along a bypass flow path B in a bypass duct, while the compressor section 14 drives air along a core flow path C for compression and communication into the combustor section 16 then expansion through the turbine section 18. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. A fire and overheat detection system (FODS) 20 is located at the gas turbine engine 10 and may be, for example, secured to a static structure of the gas turbine engine 10. The FODS 20 is configured such that sensor elements are exposed to fluid flow at or around the gas turbine engine 10 and detect a change in temperature of the fluid flow which may be indicative of a fire or overheat condition.

Figure 2:
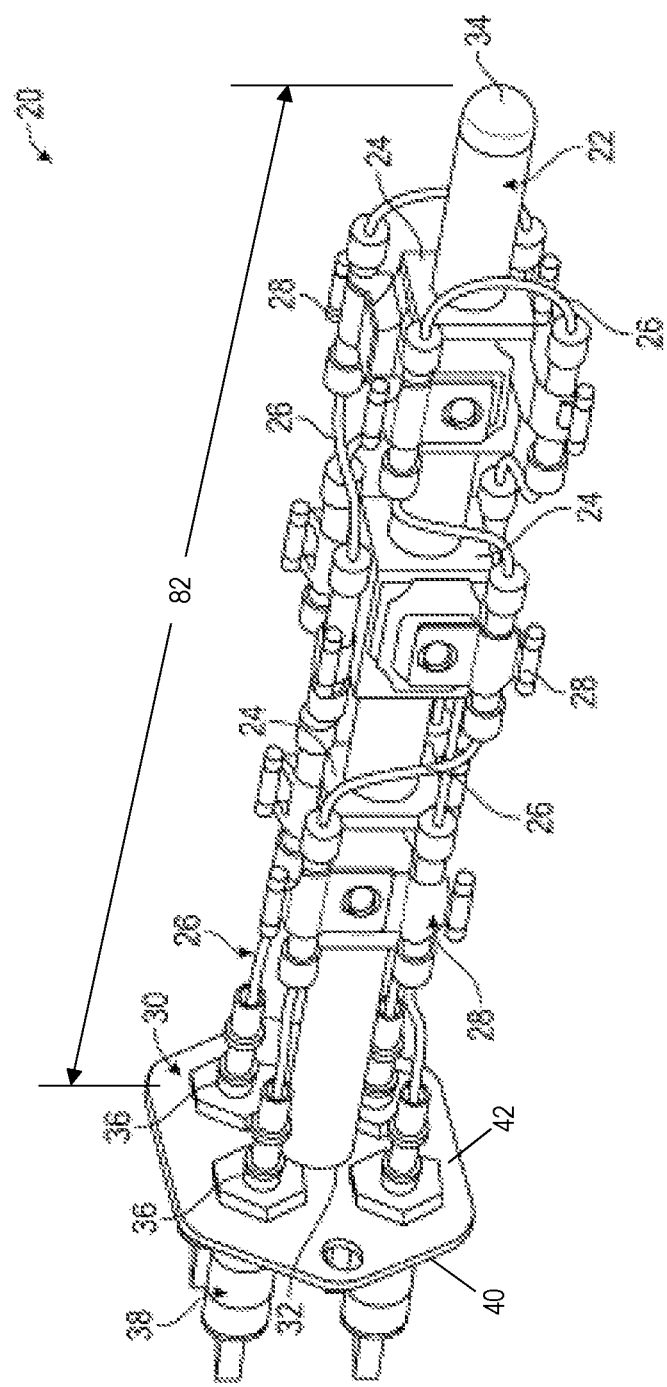
FIG. 2 is a schematic view of an embodiment of a rail-mounted fire and overheat detection system.

Referring now to FIG. 2, a perspective view of an embodiment of a FODS 20 is illustrated. The FODS 20 includes a rail 22, which in some embodiments is tubular. The rail 22 illustrated in FIG. 2 is tubular and has a circular cross-section. It is to be appreciated, however, that other embodiments of rails 22 may utilize other cross-sectional shapes, such as rectangular or oval. The rail 22 has one or more support blocks 24 positioned along a rail length 82. The support blocks 24 are secured to the rail 22 and are supportive of one or more sensor tubes 26 of the FODS 20. The sensor tubes 26 are positioned at the support blocks 24 by, for example, a support block clamp 28 to retain the sensor tubes 26 in selected positions along the rail 22. The rail 22 is fixed to a plate 30, at a first rail end 32 of the rail 22, the rail 22 extending to a second rail end 34 of the rail 22. The plate 30 may include tube fittings 36, through which the sensor tubes 26 are routed. The sensor tubes 26 are connected to an Inert Terminal Lug Sensing (ITLSE) apparatus 38. The ITLSE apparatus 38 is disposed at a second side 40 of the plate 30, opposite a first side 42 from which the rail 22 extends.

Figure 3:
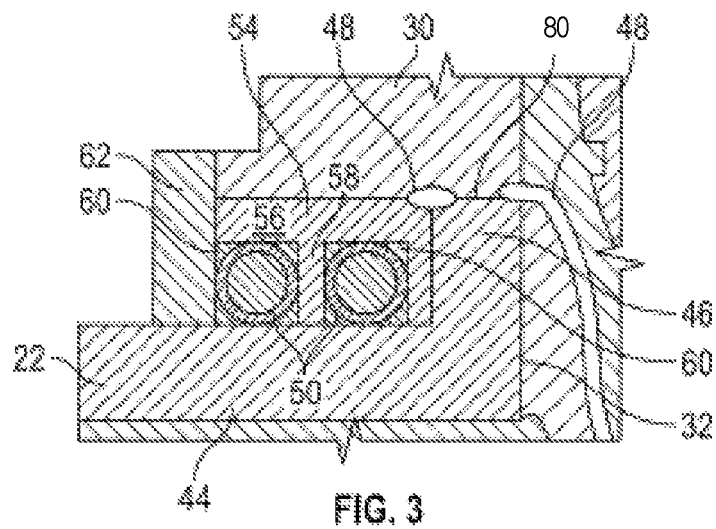
FIG. 3 is a schematic cross-sectional view of an embodiment of a joint of a rail-mounted fire and overheat detection system.

Referring now to FIG. 3, the rail 22 is secured to the plate 30 via a welded joint. The plate 30 includes a plate opening 80 into which the rail 22 is installed. The rail 22 include a rail tube 44, and a rail flange 46 extending outwardly from the rail tube 44. The rail flange 46 defines the first rail end 32. The rail 22 is installed into the plate opening 80 such that rail flange 46 is inside the plate opening 80. The rail flange 46 is secured to the plate 30 via a butt weld 48 at the plate opening 80.

Figure 4:
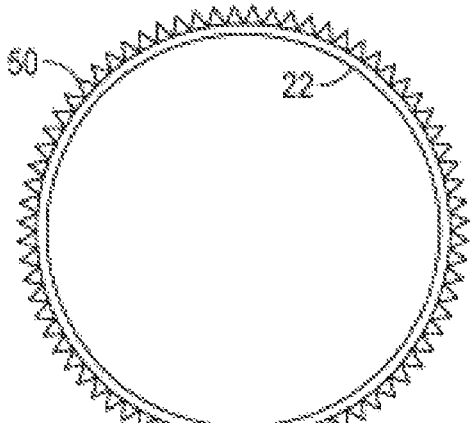
FIG. 4 is another cross-sectional view of an embodiment of a rail-mounted fire and overheat detection system.
Figure 5:
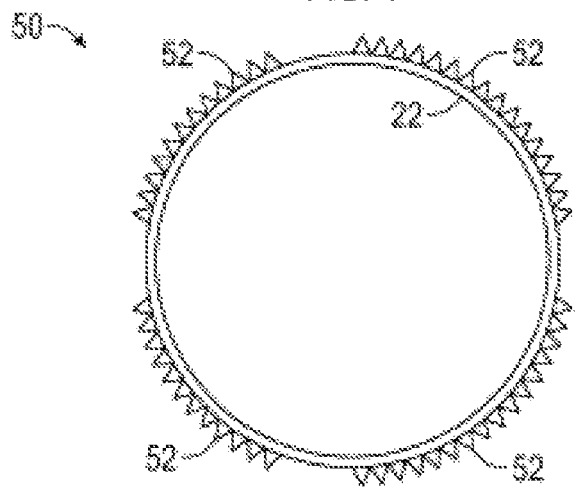
FIG. 5 is yet another cross-sectional view of an embodiment of a rail-mounted fire and overheat detection system.

The FODS 20 is subjected to vibration during operation, and as such includes a vibration damper arrangement to dampen relative motion of the rail 22 and the plate 30, which can result in the deterioration of the joint between the rail 22 and the plate 30. The vibration damper arrangement includes one or more damper elements 50 located between the rail 22 and the plate 30 at the plate opening 80 and extending around a perimeter of the rail 22. In some embodiments, referring to FIG. 4, the damper elements 50 are garter springs extending around the rail 22. The damper elements 50 may be unitary and extend entirely around the perimeter of the rail 22, while in other embodiments, such as shown in FIG. 5, the damper elements 50 may be segmented, with a plurality of damper segments 52 arranged around the circumference. While the illustrated damper elements 50 are garter springs, on skilled in the art will appreciate that other damper elements such as elastomeric elements may be used.

Referring again to FIG. 3, in some embodiments more than one damper element 50 is used. In such embodiments, a cage 54 is installed to maintain separation between adjacent damper elements 50. The cage 54 includes a cage rim 56 located at the plate opening 80 and a cage web 58 extending inwardly from the cage web 58 toward the rail 22. The cage web 58 defines damper pockets 60 between the rail 22 and the cage rim 56 where the damper elements 50 are located. A face plate 62 is installed to the plate 30 to axially retain the cage 54 and the damper elements 50. In some embodiments, the face plate 62 is secured to the plate 30 via, for example, welding.

Figure 6:
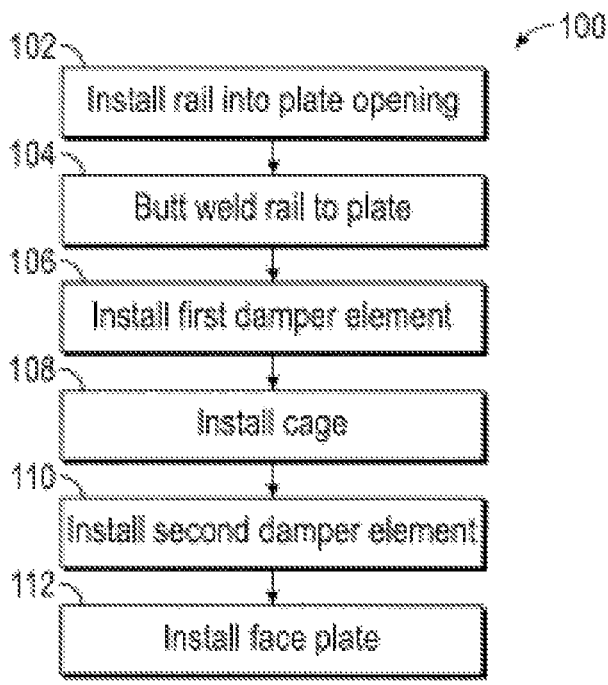
FIG. 6 is a schematic illustration of a method of assembly of a rail-mounted fire and overheat detection system.

An assembly method 100 for a FODS 20 is schematically illustrated in FIG. 6. First, at block 102, the rail 22 is installed into the plate opening 80. In block 104, the rail 22 is butt-welded to the plate 30 at the plate opening 80. In block 106, a first damper element 50 is installed, and at block 108 the cage 54 is installed over the first damper element 50. A second damper element 50 is installed at block 110, then the face plate 62 is installed at block 112.

Figure 7:
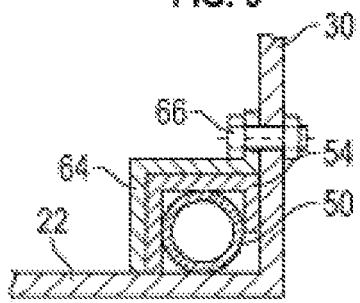
FIG. 7 is a schematic cross-sectional view of another embodiment of a joint of a rail-mounted fire and overheat detection system.
Figure 8:
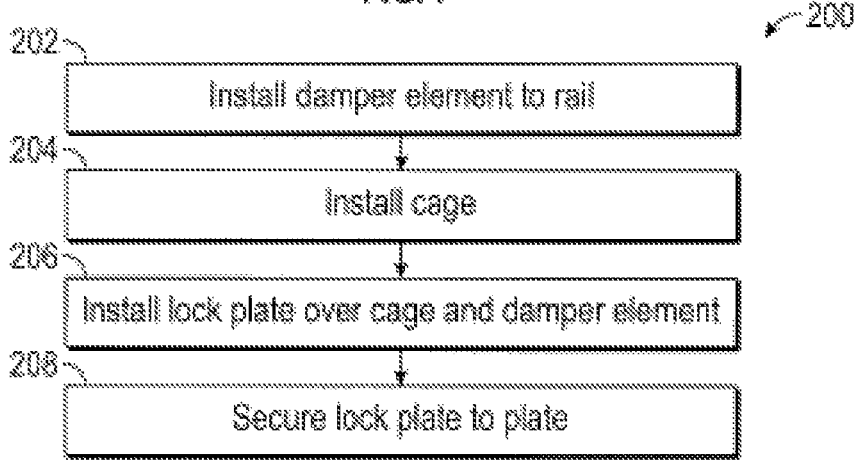
FIG. 8 is a schematic illustration of another method of assembly of a rail-mounted fire and overheat detection system.

Referring now to FIG. 7, another embodiment of a FODS 20 is illustrated. In the embodiment of FIG. 7, a lock plate 64 is utilized in place of the face plate 62, with the lock plate 64 secured to the plate 30 by one or more bolts 66 extending through the lock plate 64 and the plate 30. Referring to FIG. 8, in this embodiment the FODS 20 may be assembled via the illustrated method 200. First, at block 202, the damper element 50 is installed at the rail 22. In block 204, the cage 54 is installed over the damper element 50. In block 206, the lock plate 64 is installed over the cage 54 and the damper element 50. At block 208, the lock plate 64 is secured to the plate 30 by the one or more bolts 66.

The presently disclosed configurations provide passive vibration control in the form of the damper elements 50. This reduces fatigue in the FODS 20, improving the service life of the FODS 20.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A rail assembly for a fire and overheat detection system comprising:
    a rail;
    a plurality of sensor elements disposed along the rail;
    a plate disposed at a first end of the rail, and secured thereto at a plate opening; and
    two or more damper elements extending about a perimeter of the rail to dampen vibrational forces acting on the rail; and
    a cage installed to maintain separation between adjacent damper elements of the two or more damper elements.

2. The rail assembly of claim 1, wherein the cage includes:
    a cage rim; and
    a cage web extending from the cage rim to define two or more damper cavities wherein the two or more damper elements are located.

3. The rail assembly of claim 1, wherein at least one damper element of the two or more damper elements are disposed at a plate opening between the plate and the rail.

4. The rail assembly of claim 1, further comprising a face plate secured to the plate to axially retain at least one damper element of the two or more damper elements.

5. The rail assembly of claim 1, wherein at least one damper element of the two or more damper elements are one or more garter springs.

6. The rail assembly of claim 1, wherein the rail includes a rail flange disposed in the plate opening.

7. The rail assembly of claim 6, wherein the rail flange is secured to the plate at the plate opening via one or more butt welds.

8. A rail and plate assembly for a rail-mounted fire and overheat detection system comprising:
    a rail, the rail configured to be supportive of a plurality of sensor elements disposed along the rail;
    a plate disposed at a first end of the rail, and secured thereto at a plate opening; and
    two or more damper elements extending about a perimeter of the rail to dampen vibrational forces acting on the rail; and
    a cage installed to maintain separation between adjacent damper elements of the two or more damper elements.

9. The rail and plate assembly of claim 8, wherein the cage includes:
    a cage rim; and
    a cage web extending from the cage rim to define two or more damper cavities wherein the two or more damper elements are located.

10. The rail and plate assembly of claim 8, wherein at least one damper element of the two of more damper elements are disposed at a plate opening between the plate and the rail.

11. The rail and plate assembly of claim 8, further comprising a face plate secured to the plate to axially retain the one or more damper elements.

12. The rail and plate assembly of claim 8, wherein at least one damper element of the two of more damper elements are one or more garter springs.

13. The rail and plate assembly of claim 8, wherein the rail includes a rail flange disposed in the plate opening.

14. The rail and plate assembly of claim 13, wherein the rail flange is secured to the plate at the plate opening via one or more butt welds.

15. A method of assembling a rail assembly for a fire and overheat detection system, comprising:
    installing a first rail end of a rail into a plate opening of a plate;
    installing one or more damper elements about a perimeter of the rail at the plate opening; and
    installing a face plate to axially retain or more damper elements
    wherein installing one or more damper elements includes:
        installing a first damper element about the perimeter of the rail;
        installing a cage to axially retain the first damper element; and
        installing a second damper element.

16. The method of claim 15, wherein the first rail end is butt welded to the plate at the plate opening.

* * * * *